United States Patent Office 3,379,614
Patented Apr. 23, 1968

3,379,614
NUCLEAR REACTOR FUEL CHANNEL
ASSEMBLY
Carl Norman Drummond, Lynchburg, Va., assignor, by mesne assignments, to the United States of America as represented by the United States Atomic Energy Commission
Filed Jan. 21, 1966, Ser. No. 522,116
17 Claims. (Cl. 176—43)

ABSTRACT OF THE DISCLOSURE

This invention is a removable fuel channel assembly for carrying nuclear fuel and conducting a coolant through a nuclear reactor. The reactor includes an enclosed tank for carrying a moderator fluid. The tank has top and bottom nozzles forming openings thereinto that act as a mount for the fuel channel assembly which extends through the tank. The assembly includes a tube terminated at either end by members seal weldable to the nozzles so that the assembly may be endwise removed from the tank on breaking the seals. The invention may further include a device for containing the moderator within the tank while the assemblies are being inserted therein and removed therefrom.

---

Figure 1:
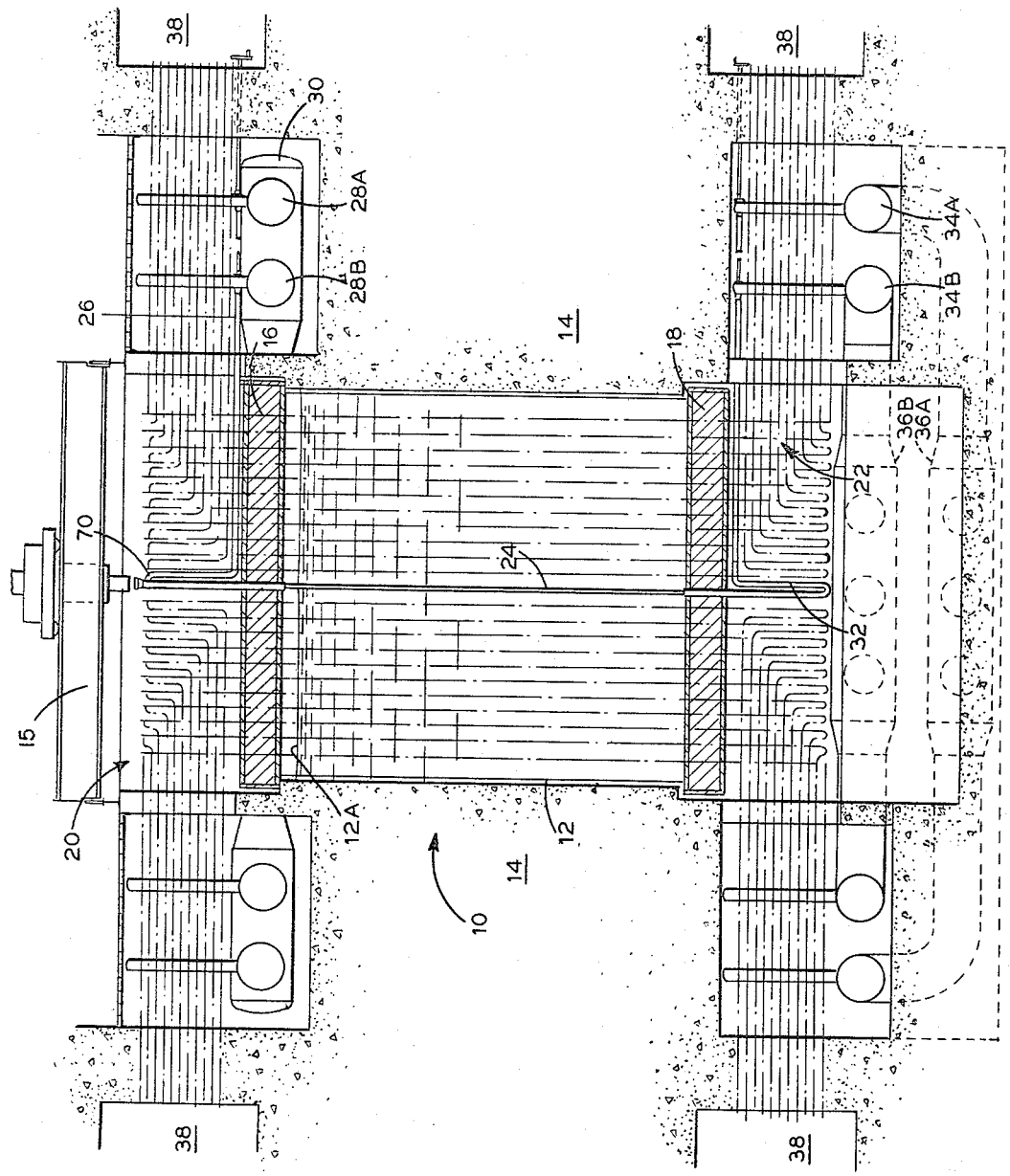

The invention described herein was made in the course of, or under, a contract with the U.S. Atomic Energy Commission.

The present invention relates in general to fuel channel assemblies for nuclear reactors and particularly to their use in reactors in which the moderator and the coolant are kept separate within the reactor core.

In the past in reactors employing a separate moderator and coolant, such as heavy water moderated organic cooled reactors, removal and replacement of the calandria tube has been a problem. The calandria tube forms a sealed barrier between the moderator and coolant and has been integrally attached to the reactor structure above and below the core to provide a leak tight seal. Removal and replacement of the calandria tube has been a problem because of its inaccessibility and its manner of attachment to the reactor structure. Formerly the removal of a calandria tube involved both a complicated removal procedure and considerable downtime for the reactor plant.

It is the primary object of the invention to provide a fuel channel assembly which is easily removed and reinstalled with only a minimum of reactor downtime.

Another object of the invention is to provide a fuel channel assembly affording the optimum heat transfer between the coolant and the fuel while keeping to a minimum the loss of heat to the moderator.

A further object of the invention is to provide a shop fabricated fuel channel assembly adapted for simple field installation and one capable of adjusting to thermal expansion in any of its members while providing requisite structural stability. Moreover, the invention includes means for avoiding loss of the moderator during fuel channel assembly removal and reinstallation.

Accordingly, the invention comprises a nuclear reactor containing a core within a moderator tank. Across the top and bottom of the tank is a shield construction through which fuel channel support tubes extend in communication with the interior of the tank. A fuel channel assembly extends through the upper support tube, the moderator tank and the lower support tube and has its opposite ends formed by upper and lower end fittings which are secured to the corresponding support tubes. Extending between and integrally attached to the end fittings is a concentric double tube member. A fuel element is situated within the moderator tank portion of the double tube member. In the double tube member, above and below the fuel element portion, are removable shield means for preventing the escape of neutrons released in the fission chain reaction. After removal of the fuel elements contained within the double tube member the fuel channel assembly itself can be readily removed from the reactor after breaking the seal welds which attach the assembly to the upper and lower fuel channel support tubes.

Additionally, the invention provides a seal for the lower end of the fuel channel assembly which avoids loss of the moderator during assembly removal and replacement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there has been illustrated and described preferred embodiments of the invention.

Figure 2:
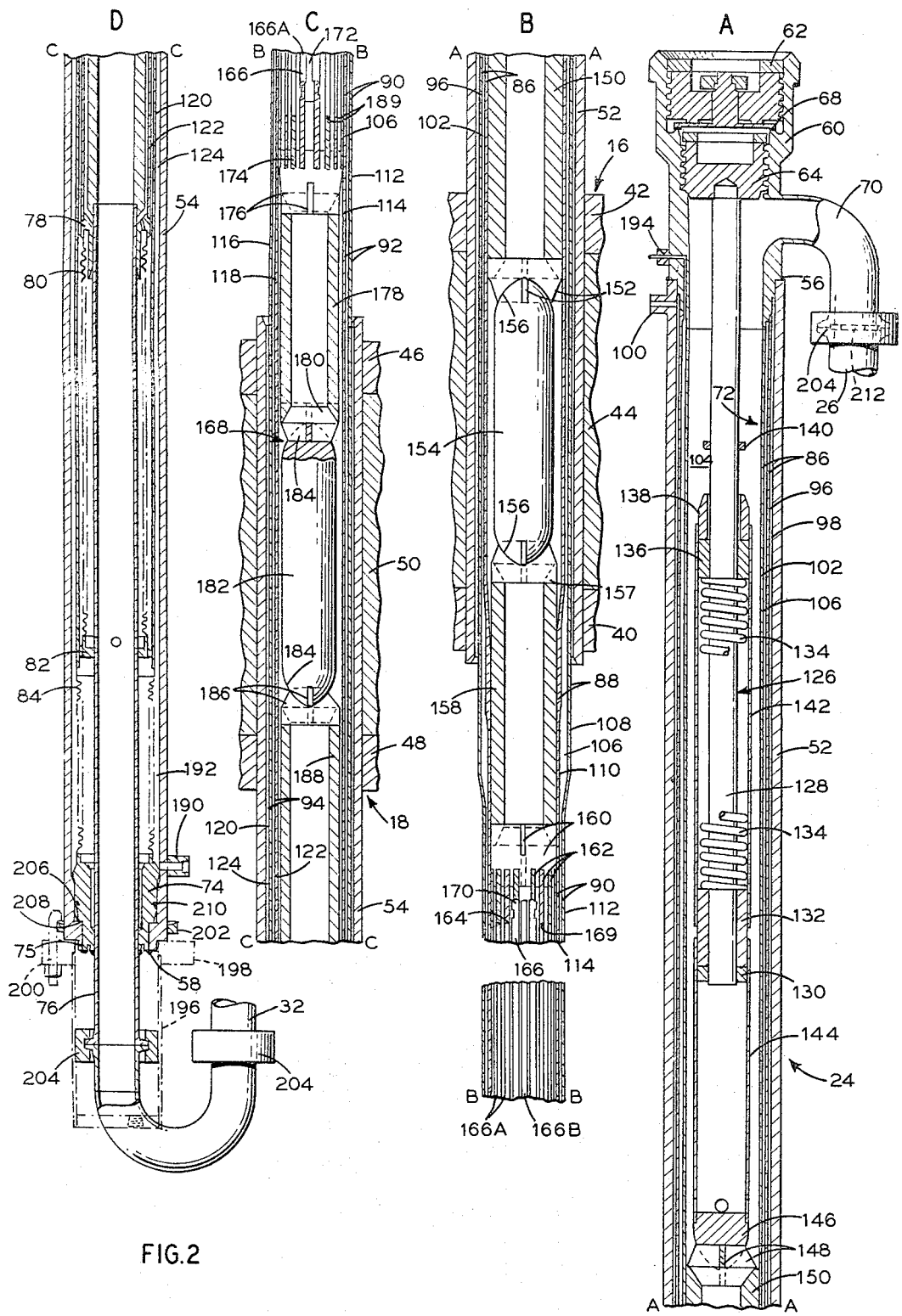

Of the drawings:

FIGURE 1 is a vertical section through a reactor incorporating the present invention; and FIGURE 2 is an enlarged vertical section through the fuel channel assembly of FIGURE 1 broken into four serially sequenced parts.

In FIGURE 1 a heavy water moderated organic coolant reactor plant 10 is shown comprising a moderator tank 12 laterally encased by concrete shielding 14 and capped at its ends by an upper shield 16 and a lower shield 18. Above and below the shields 16 and 18 are an upper fuel channel distribution chamber 20 and a lower fuel channel distribution chamber 22 respectively. Extending through the moderator tank between the distribution chambers are a plurality of fuel channel assemblies 24. At its upper end each fuel channel assembly is selectively connected by means of a conduit 70 to either of headers 28A or 28B which are in turn connected to a junction header 30. The lower end of each fuel channel assembly is similarily selectively connected by a conduit 32 to either of headers 34A or 34B which in turn are connected to inlet and outlet headers 36A and 36B respectively. As shown in FIGURE 1 the coolant flow destined for the fuel channel assemblies 24 enters through inlet header 36A, passes into header 34A, then proceeds upwardly through a selected group of fuel channel assemblies 24 to header 28A and finally into the junction header 30. From header 30 the coolant enters header 28B and passes downwardly through the remainder of the fuel channel assemblies 24 into the header 34B and finally leaves the assemblies by way of the outlet header 36B. The flow of coolant through the reactor may be multi-pass such as described, or alternatively it could be a single pass which would of course require altering the header arrangement so the inlet header would be at one extremity of the fuel assemblies and the outlet header at the opposite extremity.

Located laterally outward from the chambers 20 and 22 are control valve stations 38 for regulating flow through the individual channel assemblies. Atop the reactor is a fuel transfer machine and associated support structure 15 for removing fuel from the assemblies and for transferring it to a storage area not shown.

The details of a typical fuel channel assembly 24 are shown in FIGURE 2. Starting from the right the fuel channel assembly is divided into four sections with match mark lines AA, BB and CC indicating the serial relationship of the sections. For purposes of description the sections are designated A, B, C and D going from right to left of the figure.

In Section B of FIGURE 2 a portion of the upper shield 16 is shown formed of a sandwich construction including a lower plate 40 spaced from an upper plate 42 by an intermediate section 44. Plate 40 forms the upper boundary of the moderator tank 12 and since it is exposed to the fission reaction and the moderator liquid is made of stainless steel while the upper plate 42 can be of carbon steel. Section 44 between these plates contains shielding material such as lead shot, magnetite, or iron fillings and water. Lower shield 18, as shown in Section C of FIGURE 2 is similar to the upper shield 16, being formed of an upper plate 46 and a lower plate 48 spaced by an intermediate section 50 all formed of materials corresponding to those in the upper shield.

Extending through the upper shield 16 and opening at its lower end to the moderator tank is upper fuel channel support tube 52. This tube 52 is integrally attached to both the lower plate 40 and upper plate 42 of the upper shield and extends upwardly to near the top of the distribution chamber 20. Similarly, from the bottom of the moderator tank 12 lower fuel channel support tube 54 extends downwardly through the lower shield 18 to a point spaced closely above the bottom of the distribution chamber 22.

Fuel channel assembly 24 is attached by field welds 56, 58 to the upper end of the upper support tube 52 and to the lower end of the lower support tube 54 respectively.

Commencing with Section A of FIGURE 2 a fuel channel assembly 24 comprises an upper end fitting 60 which includes a removable closure plug 62 and a plug latch 64. An annular seal 68 is disposed between the closure plug 62 and an upwardly facing bearing surface on the end fitting 60. A right angle coolant connection 70 extends from the end fitting 60 and is connected to the conduit 26 (see FIGURE 1). As previously mentioned the end fitting 60 is integrally attached to the upper end of the support tube 52 and fits down into it a short distance forming a sliding fit with the support tube.

Fitted within support tube 52 a concentric double tube member 72 extends downwardly through the support tube 52, the upper shield 16, and the moderator tank 12 into the lower support tube 54 and is secured at its lower end to lower end fitting 74. The end fitting 74 is welded to support tube 54 at its lower end and an annular U-shaped groove 75 is provided in the fitting circling the weld to avoid the development of undue thermal strain. Centrally disposed within the end fitting 74 and extending upwardly through the support tube is tube 76. An upper ring member 78 is located around the upper end of tube 76 and has a corrugated inner tube expansion bellows 80 extending downwardly from ring 78 to a lower ring member 82 which in turn is integrally attached to the lower support tube 76. Located below inner bellows 80 is outer tube expansion bellows 84 connected at its lower end to the end fitting 74 and at its upper end to the outer component of double tube member 72.

Double tube member 72 is divided into an upper section 86 which extends through the distribution chamber 20 and the upper support tube 52, an upper transition section 88 which connects the section 86 with moderator tank section 90 and a lower transiton section 92 which joins the moderator tank section with lower section 94 which extends downwardly through the lower support tube 54 and lower distribution chamber 22.

Section 86 comprises an outer tube 96 attached at its upper end to the fitting 60 and spaced inwardly from the support tube 52 forming a narrow annular flow passage 98 which communicates at its lower end with the moderator tank. The upper end closure of the passageway 98 is formed by the end fitting 60 and the support tube 52. A connection 100 extends through the support tube to the passageway 98. Spaced centrally within outer tube 96 is inner tube 102 which provides the coolant flow channel 104 for the fuel channel assembly while the annular space 106 between the inner and outer tubes forms the upper portion of a passageway which extends the length of the double tube member 72.

Upper section 86 of the double tube member 72 terminates a short distance above the lower end of support tube 52 and is integrally connected to transition section 88 adjacent upper shield 16. It comprises an outer conduit 108 and an inner conduit 110 which extends downwardly into the moderator tank 12. Both outer tube 108 and inner tube 110 have a smaller diameter at their lower ends where they are connected to the moderator tank section 90. The tubes of the section 88 may incorporate bimetallic joints forming the transition from the material of section 86 to those of the moderator tank section 90. Tubes 108 and 110 are spaced apart forming a continuation of the annular space 106.

The moderator tank section 90 is formed by an outer tube 112 closely spaced from an inner tube 114 with the intervening space providing a continuation of the annular space 106 through the moderator tank. Because this section of the double tube member is in the core region of the reactor to limit the absorption of neutrons from the fission reaction, the outer tube 112 is formed of Zircaloy 2, a zirconium alloy, while the inner tube 114 is made of sintered aluminum powder (SAP).

Transition section 92, adjacent lower shield 18, like section 88 is composed of an outer tube 116 and an inner tube 118 providing the changeover from the moderator tank section to the lower section 94 within the support tube 54 and similarly the space between these tubes forms a continuation of the passageway or space 106.

Within support tube 54 lower section 94 comprises an outer tube 120 and an inner tube 122. The outer tube is spaced from both support tube 54 and the inner tube 122 providing a narrow annular passageway 124 around its outer periphery and the continuation of the passageway 106 between it and inner tube 122. The outer tube 120 is connected at its lower end to outer bellows 84, and the inner tube is integrally attached to the connection ring 78.

Extending through the inner tube 102 of the double tube member 72 from the latch 64 to the upper end of the moderator tank is top shield plug assembly 126. This assembly comprises a rod 128 extending axially downward from the latch 64 and having a collar 130 positioned at its lower end. Immediately above the collar is a short tubular cylinder 132 which fits over the rod in a sliding engagement. Extending upwardly from the upper end of cylinder 132 to a ring member 136 is a spring 134. The ring member is integrally attached to the rod around its upper end and above it is collar 138 disposed in loosely fitting engagement about the rod. Spaced upwardly from collar 138 is a stop ring 140 which encircles and is attached to the rod.

Forming a housing about the spring is tubular member 142 which is attached at its upper end to collar 138 and its lower end to cylinder 132. A similar tubular member 144 is also attached to cylinder 132 below tubular member 142, extending downwardly to an integral end plug 146. A pair of plates 148 disposed at right angles to each other join the plug 146 to a first flow member 150. The first flow member 150, arranged within and in a closely spaced relationship with the inner tube 102 has a wall thickness such that its inside diameter is less than the outside diameter of the second tubular member 144.

In the upper portion of Section B of FIGURE 2 the first flow member 150 is attached by a pair of perpendicularly disposed plates 152 to a plug member 154 having bullet nose ends 156. The outside diameter of plug 154 is greater than the inside diameter of first flow member 150. At its lower end another pair of plates 157 disposed normally to one another connect the plug to second flow member 158 which extends downwardly from the lower end of upper support tube 52 into the upper region of the moderator tank. The flow member 158 is similar to first flow member 150 in construction, however, its outer diameter is somewhat less because within the transition section 88 the inner tube 110 is of a smaller diameter than inner tube 102 of the upper section. At the lower end of second flow member 158 the upper or top shield plug assembly 126 terminates in another right angled plate section 160 from which depends four concentrically arranged support cylinders 162. The lower edge of each cylinder 162 has an inverted V-notch 164.

Within inner tube 114 in the moderator tank a fuel element 166 extends between and is supported by the lower end of upper shield plug assembly 126 and the upper end of lower shield plug assembly 168. In Sections B and C of FIGURE 2 the fuel element is shown comprising four concentric tube 166A and a center filler member 166B. The upper ends of the fuel tubes have a V-shaped peak 169 which fits into the notches 164 in the four concentric cylinders 162. Additionally the upper end of the innermost fuel tube forms a lifting knob 170. Similarly the lower ends of the fuel element tubes contain inverted V-shaped notches 172. It should be understood that in addition to the fuel tubes illustrated other types of fuel components, such as pins, or plates, may be employed in the fuel channel assembly and that this fuel element may be composed of multiple longitudinally extending sections.

The lower shield plug assembly 168 resembles the upper shield plug assembly 126, however, it does not contain the encased spring construction. Positioned serially below the fuel element are concentric support cylinders 174, plates 176, upper flow member 178, plates 180, lower plug shield 182 having bullet nose ends 184, plates 186 and a lower flow member 188 all of which extend downwardly and are supported against the upper end of tubes 76. The support cylinders 174 have V-shaped peaks 189 about their upper ends fitting into the corresponding notches 172 in the bottom of the fuel tubes 166A. At their opposite ends the cylinders 174 are connected to the plates 176 which in turn are connected to the upper end of the upper flow member 178. The plates 180 and 186 provide the connection between the lower plug shield 182 and the upper and lower flow members 178 and 188. Plug shield 182 has an outside diameter which is greater than the interior diameter of the flow members 178, 188 positioned above and below it, which is the same arrangement as for the top plug shield 154, so that a neutron escaping from the fuel element region of the channel assembly cannot "see" through the channel. The plates 176, 180 and 186 comprise pairs of perpendicularly disposed plates similar to those employed in the upper or top shield plug assembly 126.

Closely spaced from the lower end of the fuel channel support tube 54 is an inlet connection 190 which communicates with an annular passageway 192 formed on its inner side by the outer bellows 84 and above it by the outer tube 120 and on its outer side by the interior of the support tube 54. This passageway opens at its upper end into the bottom of the moderator tank 12. At the opposite end of the fuel channel assembly in the upper end fitting 60 inlet connection 194 passes through the fitting into the annular passageway 106 formed between the inner tube 102 and the outer tube 96 of the double tube member.

At the lower end of Section D in FIGURE 2 a maintenance can 196 shown in phantom, is employed during removal of the fuel channel assembly to avoid loss of the moderator from the tank. The manner in which this maintenance is used will be more fully described, in the explanation of the steps involved in removing the fuel channel assembly from the reactor. The can is of sufficient diameter to fit over the lower end of the tube 76 and bears upwardly against the bottom of the lower support tube 54. The top of the maintenance can is provided with a flange 198 which forms the bearing surface against the support tube. Disposed about the periphery of the flange 198 are a plurality of latch members 200 which engage ring 202 on the outside of the support tube 54.

Mechanical joints 204 provide the connection between the fuel channel assembly 24 and the conduits 26, 32 in the distribution chambers 20, 22 respectively.

In the event of failure in the double tube member 72 of the fuel channel assembly the fission reaction is shut down and coolant flow is discontinued. After shut down the first step is to remove the fuel channel assembly internals. This is done remotely by removing the closure plug 62 and then taking out in the stated order the plug latch 64 and upper shield plug assembly 126, the fuel element 166 and the lower shield plug assembly 168. To remove the remaining fuel channel assembly components the upper and lower connections 204 are broken and welds 56 and 58 cut. The double tube element and the attached end fittings 60 and 74 may now be removed from the fuel channel support tubes. The coolant may either be allowed to freeze in the fuel element assembly channel or if its melting point is sufficiently low it may be drained from the channel at this point in the removal operation. The coolant may be one of the Santowax hydrocarbons, however, other organic or inorganic coolants may be employed in the fuel channel assembly described.

In view of the shielding 16, 18 it is possible for reactor plant personnel to enter chambers 20, 22 and break the seal welds without being exposed to dangerous levels of radiation. Before the double tube member 72 and end fittings 60 and 74 of the channel assembly can be removed maintenance can 196 must be attached to the lower end of the lower support tube 54 since with the double tube assembly 72 removed the moderator can flow downwardly from the tank 12 through the lower fuel channel support tube 54. Because of its cost every effort is made to avoid any loss of the heavy water moderator though the same arrangement would be used if another moderator were employed. After removing the U-tube section connecting conduit 32 and tube 76 the flange 198 of the maintenance can is abutted against the edge of the lower fuel channel support tube and its latches 200 are secured to the ring 202 urging it into tightly fitting engagement with the support tube. With the maintenance can 196 in place the fuel channel assembly comprising the upper end fitting 60, double tube assembly 72 including the bellows 80 and 84 and the lower end fitting 74 may be removed as a unit as already stated. The moderator will then flow downwardly through the lower chamber support tube into the maintenance can 196.

Replacement of the fuel channel assembly can be made with a factory assembled unit by inserting it downwardly through the upper fuel channel support tube and the moderator tank and the lower fuel channel support tube until the lip 206 near the bottom of the lower end fitting rests against the juxtaposed surface 208 on the lower fuel channel support tube 54. Closely above the lip 206 an O-ring sealing gasket 210 is arranged in a groove around the lower end fitting and provides a seal with the opposed surface of the lower fuel channel support tube. This seal prevents the loss of any moderator from the passageway 192. With the O-ring 210 seal properly seated it is now possible to remove the maintenance can 196. With the double tube member 72 and end fittings 60 and 74 in position the seal welds 56, 58 can now be made securing the assembly in place. The final steps involve installing the mechanical joints 204, connecting the coolant conduits 26 and 32 to the assembly, inserting the lower plug assembly 168, the fuel element 166, and the upper plug assembly 126 and plug latch 64 and then placing the closure plug 62 into the upper end fitting 60 to complete the replacement. During reactor operation the coolant flow through individual assemblies is controlled by means of orifice plates 212 located in conduit 70.

In FIGURE 1 the coolant flow path through the reactor may be traced starting with inlet header 36A then through the conduits 32 and upwardly through a selected portion of the fuel channels to the upper chamber 20 thence via conduits 26 into the header 28A from whence it passes through junction header 30 and enters header 28B to commence its downward flow through the remaining fuel channel assemblies. At the end of this pass through the reactor the coolant flows into the outlet header 36B and is then pumped to a heat exchanger or other means where the heat is extracted from the coolant. For almost the entire height of the fuel channel assembly the annular space 106 between the inner and outer tubes of the double tube assembly 72 forms a thermal barrier into which a gas is fed through the inlet connection 194 to provide insulation of the coolant within channel 104 from the moderator fluid.

Moderator fluid is delivered through the inlet connection 190 at the lower end of the lower fuel channel support tube 54 and flows upwardly through the space 192 into the moderator tank 12. In FIGURE 1 a moderator level 12A is shown within the tank 12 providing a space between it and the lower face of the upper shield 16. A moderator cover gas is introduced into this space through the connection 100 and passageway 98.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. In a nuclear reactor comprising a moderator tank, a first shield disposed across the top of said tank, a second shield disposed across the bottom of said tank, an upper fuel channel support tube extending through said first shield and opening into said moderator tank, a lower fuel channel support tube extending through said second shield and opening into said moderator tank, a fuel channel assembly for maintaining coolant fluid separate from the moderator within said moderator tank and comprising:
   (A) an upper end fitting seal welded to the upper end of and extending downwardly into said upper fuel channel support tube,
   (B) a lower end fitting seal welded to the lower end of and extending upwardly into said lower fuel channel support tube, and
   (C) a concentric double tube member integrally attached to and extending between said upper and lower end fittings whereby after breaking the seal welds between the said end fitting and said upper and lower fuel channel support tubes the fuel channel assembly can be removed as a unit.

2. A fuel channel assembly as set forth in claim 1 wherein a fuel element is removably supported within said double tube and shield means are positioned within said double tube on each end of said fuel element.

3. A fuel channel assembly as set forth in claim 2 wherein the tubular components of said double tube member are spaced apart forming an annular passageway extending through said moderator tank.

4. A fuel channel assembly as set forth in claim 3 wherein said double tube member is spaced from said upper fuel channel support tube and said lower fuel channel support tube forming therebetween an upper and a lower flow space in communication with the interior of said moderator tank.

5. A fuel channel assembly as set forth in claim 4 wherein a coolant conduit is connected to each of said upper and lower end fittings for the flow of coolant through the inner tubular component of said double tube member.

6. A fuel channel assembly as set forth in claim 5 wherein said coolant conduits and said upper and lower end fittings are connected together by mechanical joint means.

7. A fuel channel assembly as set forth in claim 5 wherein said fuel element comprises a plurality of elongated components extending axially through the inner tubular component of said double tube member.

8. A fuel channel assembly as set forth in claim 7 wherein said fuel element comprises a plurality of concentric fuel tubes of diminishing thickness relative to the distance from the center of said fuel element.

9. A fuel channel assembly as set forth in claim 7 wherein an upper shield assembly is disposed above and a lower shield assembly is disposed below said fuel element within the inner tubular component of said double tube member.

10. In a nuclear reactor comprising a moderator tank, a first shield disposed across the top of said tank, a second shield disposed across the bottom of said tank, an upper fuel channel support tube extending through said first shield and opening into said moderator tank, a lower fuel channel support tube extending through said second shield and opening into said moderator tank, a fuel channel assembly for maintaining coolant fluid separate from the moderator within said moderator tank and comprising:
   (A) an upper end fitting seal welded to the upper end of and extending downwardly into said upper fuel channel support tube,
   (B) a lower end fitting seal welded to the lower end of and extending upwardly into said lower fuel channel support tube, and
   (C) a concentric double tube member integrally attached to and extending between said upper and lower end fittings whereby after breaking the seal welds between the said end fittings and said upper and lower fuel channel support tubes the fuel channel assembly can be removed as a unit, the tubular components of said double tube member being spaced apart forming an annular passageway extending through said moderator tank, said double tube member being spaced from said upper fuel channel support tube and said lower fuel channel support tube forming therebetween an upper and a lower flow space in communication with the interior of said moderator tank,
   (D) a fuel element removably supported within said double tube and shield means positioned within said double tube on each end of said fuel element, said fuel element comprising a plurality of elongated components extending axially through the inner tubular component of said double tube member,
   (E) an upper shield assembly disposed above and a lower shield assembly disposed below said fuel element within the inner tubular component of said double tube member,
said upper shield assembly comprising a lifting rod, a plurality of coolant flow directing means arranged to provide shielding transversely blocking the inner tubular component of said double tube member against the flow of neutrons released in the fission reaction, and resilient means for absorbing axial dimensional changes within said double tube member, and a coolant conduit connected to each of said upper and lower end fittings for the flow of coolant through the inner tubular component of said double tube member.

11. A fuel channel assembly as set forth in claim 10 wherein said lower shield assembly comprises a plurality of coolant flow directing means arranged to provide shielding transversely blocking the inner tubular component of said double tube member against the flow of neutrons released in the fission reaction.

12. A fuel channel assembly as set forth in claim 11 wherein said double tube member comprises a middle double tube section containing said fuel element, a transition section attached to and positioned at each end of said middle double tube section, an upper double tube section containing said upper shield assembly and extending between said upper end fitting and said transition section on the upper end of said middle double tube section, and a lower double tube section containing said lower shield assembly and extending between said lower end fitting and said transition section on the lower end of said middle double tube section.

13. A fuel channel assembly as set forth in claim 12 wherein a latch ring is disposed around the lower end of said lower fuel channel support tube, a maintenance can having a plurality of latches engageable with said latch ring forms a seal for the lower end of said lower fuel channel support tube when said lower coolant conduit is removed from the lower end of said lower end fitting whereby upon the removal of said double tube member from the fuel channel assembly the moderator does not escape through the bottom of said lower fuel channel support tube.

14. In a nuclear reactor including a core contained within a moderator fluid carrying tank having upper and lower ends formed by shields, an improved arrangement for carrying a nuclear fuel within the core and conducting a coolant through the tank apart from the moderator fluid, the improvement comprising:
(A) an upper support tube having an upper end and a lower support tube having a lower end, said support tubes being respectively supported by the upper and lower shields, the tubes extending into the tank and being in fluid flow communication therewith,
(B) a removable channel assembly endwise insertable in the tubes and removably supported thereby so as to close said ends of said tubes, the assembly being at least partially immersed in the moderator when inserted and being constructed and arranged to support the nuclear fuel within the core and conduct the coolant through the tank apart from the moderator.

15. The arrangement according to claim 14 wherein the channel assembly includes an upper end fitting removably seal weldable on the upper end of the upper support tube and a lower end fitting removably seal weldable to the lower end of the lower support tube for removably mounting the assembly in place, the lower end fitting being movable through the tube.

16. The arrangement according to claim 15 including a sealing gasket mounted on the lower end of the channel assembly for disposition intermediate the tube and channel assembly when the channel assembly is inserted.

17. The arrangement according to claim 15 in combination with a removable means for closing the lower support tube to contain the moderator within the tank when the channel assembly is not in place.

References Cited
UNITED STATES PATENTS

| | | | |
|---|---|---|---|
| 2,977,297 | 3/1961 | Evans et al. | 176—52 |
| 3,193,469 | 7/1965 | Bradley et al. | 176—64 X |
| 3,208,915 | 9/1965 | Campbell et al. | 176—64 X |
| 3,226,301 | 12/1965 | Bernard et al. | 176—52 |
| 3,230,149 | 1/1966 | Boiron | 176—50 |

FOREIGN PATENTS

| | | |
|---|---|---|
| 674,486 | 11/1963 | Canada. |
| 1,337,403 | 8/1963 | France. |
| 894,668 | 4/1962 | Great Britain. |

REUBEN EPSTEIN, *Primary Examiner.*